United States Patent
Gao et al.

(10) Patent No.: US 7,441,325 B2
(45) Date of Patent: Oct. 28, 2008

(54) PERPENDICULAR HEAD WITH TRAILING SHIELD AND RHODIUM GAP PROCESS

(75) Inventors: Yunxiao Gao, Sunnyvale, CA (US); Hung-Chin Guthrie, Saratoga, CA (US); Ming Jiang, San Jose, CA (US); Sue Siyang Zhang, Saratoga, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 493 days.

(21) Appl. No.: 11/195,222

(22) Filed: Aug. 1, 2005

(65) Prior Publication Data

US 2005/0259355 A1 Nov. 24, 2005

Related U.S. Application Data

(63) Continuation-in-part of application No. 10/836,867, filed on Apr. 30, 2004.

(51) Int. Cl.
*G11B 5/127* (2006.01)
*H04R 31/00* (2006.01)

(52) U.S. Cl. .......... 29/603.16; 29/603.13; 29/603.15; 29/603.18; 205/119; 205/122; 360/122; 360/317; 451/5; 451/41

(58) Field of Classification Search .......... 29/603.07, 29/603.13–603.16, 603.18; 205/119, 122; 360/122, 125, 317; 427/127, 128; 451/5, 451/41
See application file for complete search history.

(56) References Cited

U.S. PATENT DOCUMENTS

| | | | |
|---|---|---|---|
| 4,656,546 A | 4/1987 | Mallory | |
| 4,803,580 A | 2/1989 | Mowry | |
| 5,315,469 A | 5/1994 | McNeil | |
| 5,475,550 A | 12/1995 | George | |
| 6,791,793 B1 * | 9/2004 | Chen et al. | 360/125.12 |
| 6,940,693 B2 * | 9/2005 | Lille et al. | 360/125.06 |
| 6,967,823 B2 * | 11/2005 | Nakamoto et al. | 360/319 |
| 2005/0024771 A1 | 2/2005 | Le | |

* cited by examiner

*Primary Examiner*—Paul D Kim
(74) *Attorney, Agent, or Firm*—Law Offices of Imam

(57) ABSTRACT

A perpendicular write head including a main pole and a trailing shield, the main pole being made of a diamond-like carbon (DLC) layer as hard mask and a rhodium (Rh) layer as shield gap, both DLC and Rh layers being CMP stop layers so as to avoid corner rounding and damage from chemical mechanical planarization (CMP) process, the DLC layer being removed by reactive ion etching (RIE) to create a trench, the trailing shield being deposited into the trench for self alignment.

13 Claims, 5 Drawing Sheets

Figure 1:
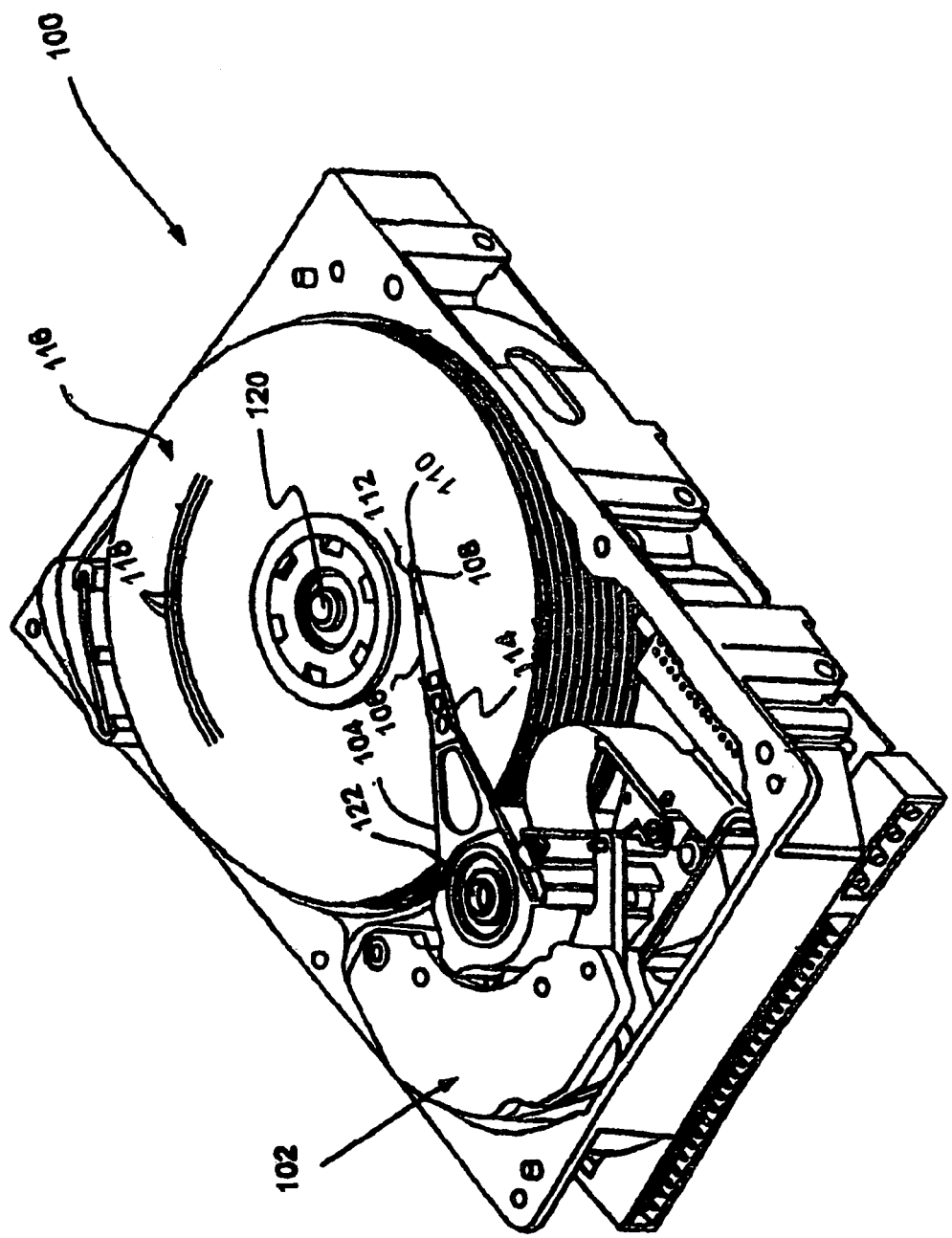

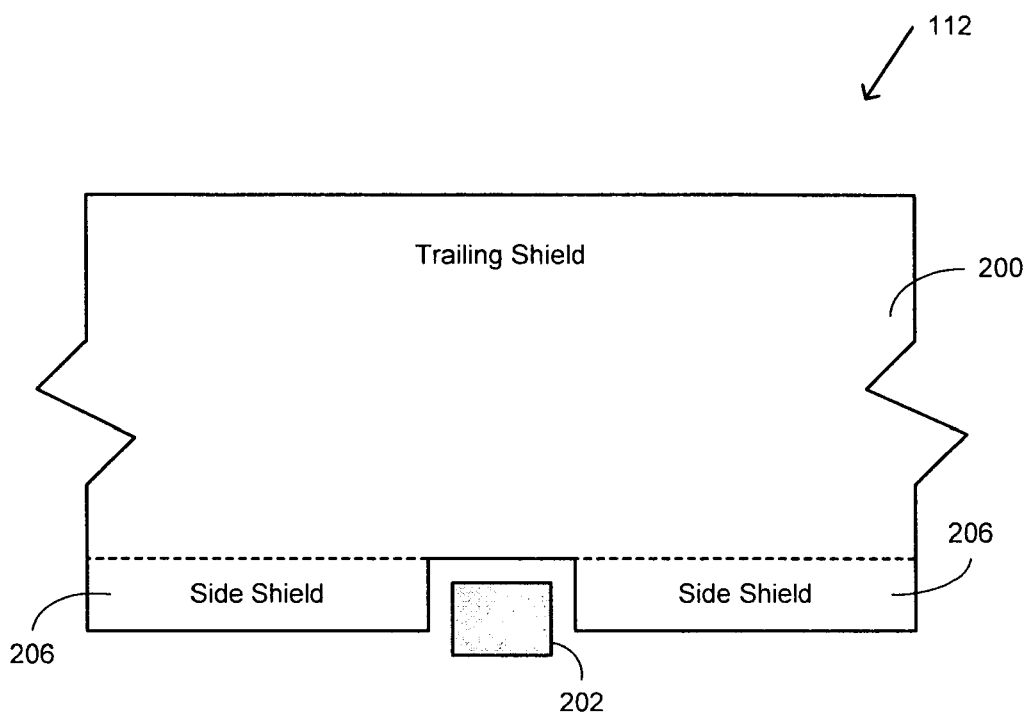
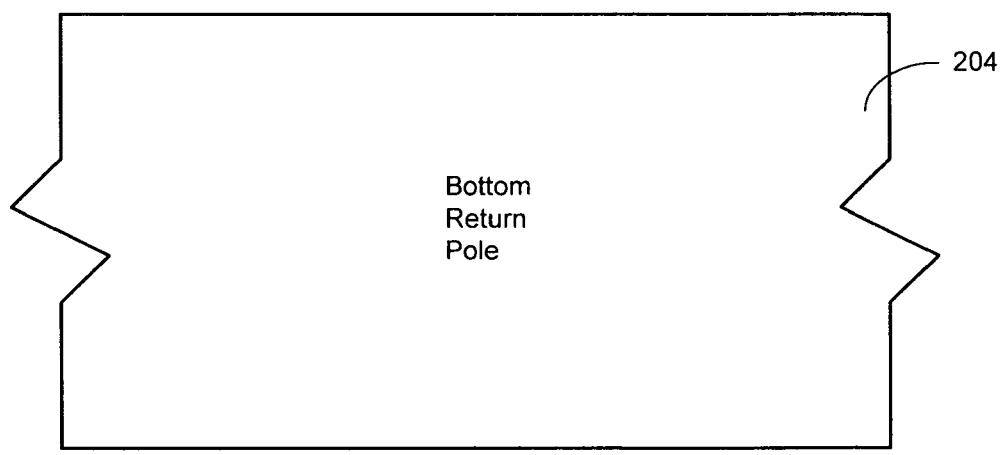
FIG. 2

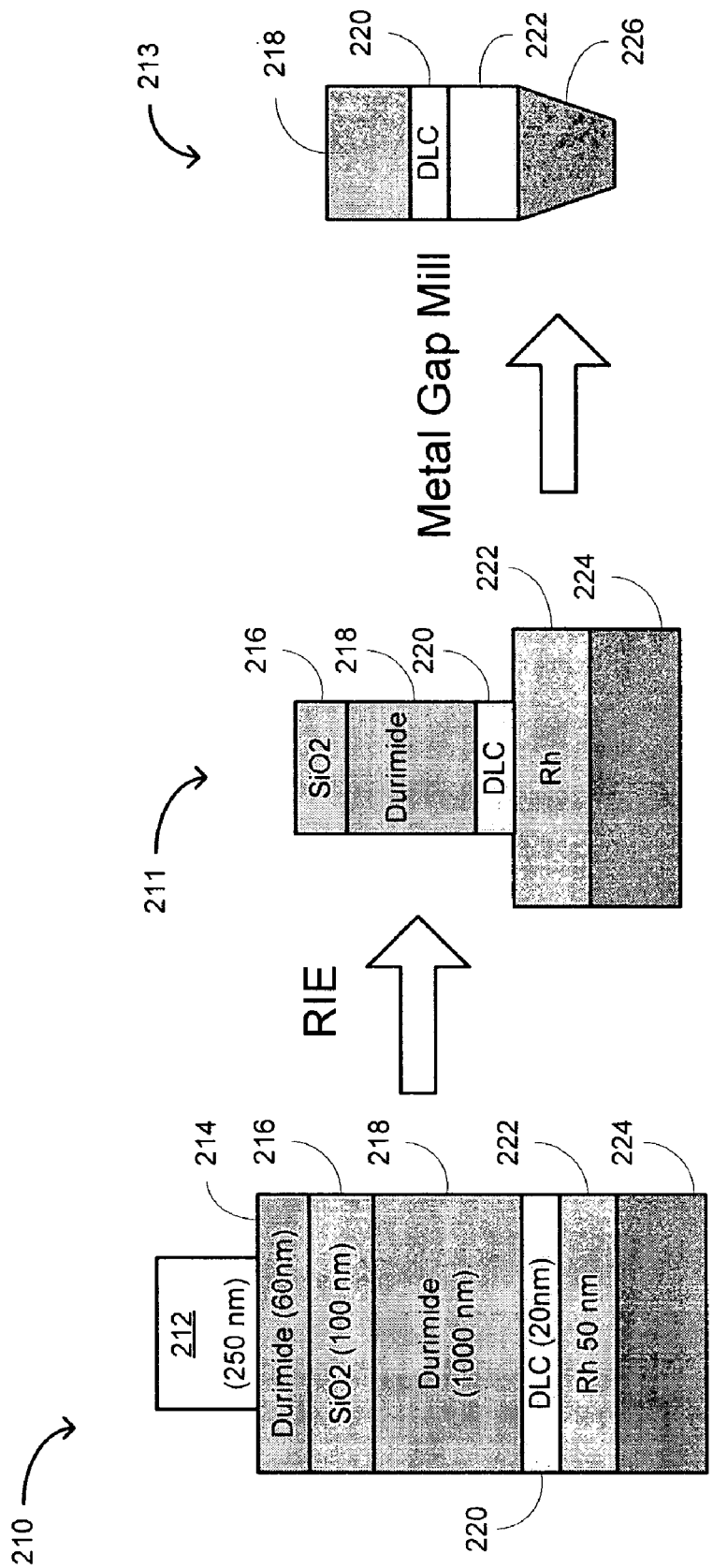

PERPENDICULAR HEAD WITH TRAILING SHIELD AND RHODIUM GAP PROCESS

CROSS REFERENCE TO RELATED APPLICATIONS

This application is a continuation-in-part of prior U.S. patent application Ser. No. 10/836,867 filed on Apr. 30, 2004 and entitled "HIGH MILLING RESISTANCE WRITE POLE FABRICATION FOR PERPENDICULAR RECORDING," the contents of which is incorporated herein by reference as though set forth in full and related to U.S. patent application Ser. No. 11/195,227, filed on Aug. 1, 2005 and entitled "BILAYER TRAILING SHIELD GAP FOR PERPENDICULAR HEAD", the contents of which is incorporated herein by reference, as though set forth in full, and related to U.S. patent application Ser. No. 11/195,532, filed on Aug. 1, 2005 and entitled "PERPENDICULAR WRITE POLE FORMATION USING DURIMIDE/ALUMINA HARD MASK WITHOUT CMP LIFTOFF, the contents of all of these documents are incorporated herein by reference, as though set forth in full.

BACKGROUND OF THE INVENTION

1. Field of the Invention

This invention relates generally to the field of perpendicular magnetic recording (or write) heads and more particularly, to a top pole and trailing shield thereof being made of Rhodium (Rh) serving as a chemical mechanical planarization (CMP) stop layer and shield gap for controlling the pole width and beveling thereof to increase performance.

2. Description of the Prior Art

As the recording density of magnetic hard drives (or disk drives) increases, a physical limitation is experienced using longitudinal recording systems partly due to thermal relaxation known as super-paramagnetism. That is, the density requirements for meeting today's storage needs are simply not attainable with longitudinal recording systems. To provide further insight into this problem, it is anticipated that longitudinal recording systems will lose popularity as storage capacities in excess of about 150 Gigabytes-per-square-inches become a requirement. These and other factors have lead to the development and expected launch of perpendicular recording heads or write heads. Perpendicular recording is promising in pushing the recording density beyond the limit of longitudinal recording.

Accordingly, perpendicular recording potentially can support much higher linear density than longitudinal recording due to lower demagnetizing fields in recorded bits.

A magnetic recording head for perpendicular writing generally includes two portions, a writer portion for writing or programming magnetically-encoded information on a magnetic media or disk and a reader portion for reading or retrieving the stored information from the media.

The writer of the magnetic recording head for perpendicular recording typically includes a main pole and a return pole which are magnetically separated from each other at an air bearing surface (ABS) of the writer by a nonmagnetic gap layer, and which are magnetically connected to each other at a back gap closure (yoke). This structure is referred to as a single-pole write head because while a main pole and return pole are referred thereto, the return pole is not physically a pole, rather, it serves to close the loop with the main pole and the soft under layer of the media to form a magnetic flux circuit.

Positioned at least partially between the main and return poles are one or more layers of conductive coils encapsulated by insulation layers. The ABS is the surface of the magnetic head immediately adjacent to the recording medium.

To write data to the magnetic medium, an electrical current is caused to flow through the conductive coil, thereby inducing a magnetic field through the write head yoke, fringing across the write head gap at the media. By reversing the polarity of the current through the coil, the polarity of the data written to the magnetic media is also reversed.

The main and return poles are generally made of a soft magnetic material. The main pole generates magnetic field in the media during recording when the write current is applied to the coil.

In perpendicular recording heads, writing and erasing of information is performed by a single-pole write head. The main pole is composed of high moment magnetic materials, the most common example being cobalt-iron (CoFe) alloys or laminate layers.

With the advent of perpendicular recording heads, density has been greatly increased, as discussed hereinabove, which has lead to a greater need for accurate recording of data onto the desired track. That is, writing to adjacent tracks is highly undesirable because it causes corruption of data on adjacent tracks.

Perpendicular write heads generally have a trailing shield, side shields, a top pole and a bottom return pole. The main pole is generally shaped in a manner causing a tip or an extension thereof that is narrower than the remaining portion thereof to form a top pole. The side shields act to shield the top pole so as to reduce adverse affects on adjacent tracks during the writing of magnetic transitions (data) at a location on a given track. One of the problems associated with prior art perpendicular write heads is controlling the critical gap thickness, i.e. the thickness between the top pole and the trailing shield. Another problem associated with prior art perpendicular write heads is the alignment of the trailing shield with the main pole. But perhaps the more severe problem therewith remains top pole damages and corner rounding caused from chemical mechanical planarization (CMP) process, such as described in further detail below.

In the recording head, namely the slider, the main pole and trailing shield are separated by the gap layer, and need to requiring improvement for controlling the deposition of the gap layer so as to have well-controlled critical gap thickness between the top pole and the trailing shield.

The top pole is generally beveled (or trapezoidal) in shape in an effort to reduce adjacent track writing. Controlling the pole width so as to better line up with the track to be written thereto needs further improvement, as does controlling the angle of the bevel of the trapezoid-shaped design of the top pole.

It is vital for the corners of the trapezoidal shape of the top pole to be straight rather than rounded, which often is experienced during manufacturing of the top pole and trailing shield. Such corner rounding generally results in the magnetic field that is induced onto the disc to be curved rather than straight. This effect adversely impacts system performance by degrading accurate recording of data onto the disc, as well as, unnecessarily higher power consumption.

Thus, in light of the foregoing, there is a need for a perpendicular recording head having a top pole and trailing shield manufactured to eliminate top pole corner rounding and to pattern the trailing shield while having well-controlled critical gap thickness between the top pole and the trailing shield and further having self-alignment of the trailing shield and the top pole.

SUMMARY OF THE INVENTION

Briefly, one embodiment of the present invention includes a perpendicular write head including a main pole having a top pole and trailing shield. The top pole is made of a diamond-like carbon (DLC) layer, as hard mask, and a Rhodium (Rh) layer, as shield gap, both DLC and Rh layers acting as CMP stop layers to protect the top pole corners from chemical mechanical planarization process, the DLC layer being removed by reactive ion etching (RIE) to create a trench for deposition of the trailing shield therein.

IN THE DRAWINGS

FIG. 1 shows a top perspective view of a disc drive 100 is shown in accordance with an embodiment of the present invention.

FIG. 2 shows an ABS view of a portion of the write head 112 having a trailing shield 200, side shields 206, a main pole 202 and a bottom return pole 204, which embodies the present invention.

FIGS. 3-9 show the relevant steps of manufacturing the main pole 202 and the trailing shield 200 in accordance with an embodiment and method of the present invention.

DETAILED DESCRIPTION OF THE PREFERRED EMBODIMENT

Referring now to FIG. 1, a top perspective view of a disk drive 100 is shown in accordance with an embodiment of the present invention. The disk 100 is shown to include a voice coil motor (VCM) 102, an actuator arm 104, a suspension 106, a flexure 108, a slider 110, a write (perpendicular) head 112, a head mounting block 114, and disk or media 116. Suspension 106 is connected to the actuator arm 104 at the head mounting block 114. The actuator arm 104 is coupled to the VCM 102. The disk 116 includes a plurality of tracks 118 and rotates about axis 120. The tracks 118 are circular, each extending circularly around the surface of the disk 116 for storing magnetically-encoded data or information using the perpendicular head 112, which will be discussed in greater detail with respect to further figures. The embodiments of the present invention reduce undesirable writing or programming of adjacent tracks, as will be apparent shortly.

During operation of the disk drive 100, rotation of the disk 116 generates air movement which is encountered by the slider 110. This air movement acts to keep the slider 110 afloat a small distance above the surface of the disk 116, allowing the slider 100 to fly above the surface of the disk 116. The VCM 102 is selectively operated to move the actuator arm 104 around the axis 120, thereby moving the suspension 106 and positioning the transducing head (not shown), which includes a main pole (not shown), by the slider 110 over the tracks 118 of the disk 116. It is imperative to position the transducing head properly to read and write data from and to the concentric tracks 118.

FIG. 2 shows an ABS view of a portion of the write head 112 having a trailing shield 200, side shields 206, a main pole 202 and a bottom return pole 204, which embodies the present invention. The side shields 206 act to shield the main pole so as to reduce adverse affects on adjacent tracks during the writing of magnetic transitions (data) at a location on a given track. It is the manufacturing and structure of the main pole 202, as will be described in further detail, that eliminates main pole damage and corner rounding resulting from CMP and that help to self-align the trailing shield 200 and that help to control the critical gap thickness between the top pole 202 and the trailing shield 200.

For information regarding other ways of forming or manufacturing the main pole, the reader is referred to U.S. patent application Ser. No. 11/195,227, filed on Aug. 1, 2005 and entitled "BILAYER TRAILING SHIELD GAP FOR PERPENDICULAR HEAD", the contents of which is incorporated herein by reference, as though set forth in full, and to U.S. patent application Ser. No. 11/195,532, filed on Aug. 1, 2005 and entitled "PERPENDICULAR WRITE POLE FORMATION USING DURIMIDE/ALUMINA HARD MASK WITHOUT CMP LIFTOFF, the contents of which is incorporated herein by reference, as though set forth in full.

FIGS. 3-9 show the steps for manufacturing the top pole 202 and the trailing shield 200 in accordance with an embodiment and method of the present invention. In particular, FIG. 3 shows the structure 210 to include a photoresist layer 212, which serves essentially as an image resist layer, shown to be formed above a durimide layer 214, which serves essentially as an anti-reflective coating (ARC) layer and is, in turn, shown formed above a silicon dioxide (SiO2) hard mask layer 216, which is, in turn, shown formed above a durimide layer 218, which is essentially a main pole patterning mask and serves as an underlayer. The durimide layer 218 is shown formed above a diamond-like carbon (DLC) layer 220, which is shown formed above a Rhodium (Rh) layer 222, which is, in turn, shown formed above a laminate layer main pole 224. In one embodiment of the present invention, a Tantalum (Ta) layer acts as an adhesion layer for the Rh layer 222 to other material and is formed below the Rh layer 222. That is, Ta may be used a seed layer prior to depositing the Rh layer 222.

Regarding the size of each layer of the structure 210, in one embodiment of the present invention, the photoresist layer 212 is 250 nanometers in thickness, however, it can be anywhere from 100-250 nanometers in thickness. In one embodiment of the present invention, the durimide layer 214 is 60 nanometers in thickness, however, it can be anywhere from 20-120 nanometers in thickness. In one embodiment of the present invention, the silicon oxide layer 216 is 100 nanometers in thickness, however, it can be anywhere from 50-150 nanometers in thickness. In one embodiment of the present invention, the durimide layer 218 is 1000 nanometers in thickness, however, it can be anywhere from 500-1500 nanometers in thickness. In one embodiment of the present invention, the DLC layer 220 is 20 nanometers in thickness, however, it can be anywhere from 5-50 nanometers in thickness. In one embodiment of the present invention, the Rh layer 222 is 50 nanometers in thickness, however, it can be anywhere from 10-50 nanometers in thickness. In one embodiment of the present invention, the laminate layer 224, which is essentially the main pole material, is 240 nanometers in thickness, however, it can be anywhere from 10-300 nanometers in thickness.

In one embodiment of the present invention, the layer 212 is made of 193 nanometer photoresist or 157 nanometer photoresist. The layer 214 is an organic anti-reflective coating and in this respect, materials other than durimide that serve as organic anti-reflecting coating may be used in replacement of durimide. The layer 216 may be replaced with SiOxNy or Tantilum (Ta) or Tungsten (W).

The width of the layer 212 defines the width of the layer 214 and the width of the layer 214 defines the width of the next layer down, the layer 216 and so on for all remaining layers. In the structure 210, the layer 212 essentially serves as mask, the layer 214 essentially serves as anti-reflecting coating, the layer 216 essentially serves as hard mask, the layer 218 serves essentially as top pole patterning mask, the layers 220 and 222 essentially serve as CMP stop layer and shield gap. The hard mask layer 216 serves to pattern the layers 218 and 220 during a reactive ion etching (RIE) process. The layer 214 is basically required due to the presence of the layer 212.

A multi-step reactive ion etching (RIE) process is performed to obtain a structure 211 of FIG. 4 from that of the structure 210 of FIG. 3. During such process, the pattern is transferred from photoresist layer 212 to the durimide layer 214, and then to the SiO2 hard mask layer 216, and finally to the durimide underlayer 218 (or milling mask) and the DLC layer 220. The resulting milling mask only has a SiO2 layer, a durimide underlayer and a DLC layer.

Next, an ion milling process is performed to obtain the structure 213 of FIG. 5, which shows the layer 224 to have become beveled to create the beveled laminate layer 226 (the beveled main pole). Additionally, milling removes the SiO2 layer 216 because it is consumed by such milling process. In fact, the ion milling process is employed in order to go through the layer 216, which is a metal layer. The ion milling process also creates a bevel-shaped pole, as noted by 226. The structure 213 ultimately includes the durimide layer 218, the DLC layer 220 and the Rh layer 222, which is the shield gap layer, and the bevel-shaped laminate pole 226. The milling process is actually a two-step milling procedure. In the first milling process, the metal gap milling, the layer 216 is removed and the structure looks like the structure 213 but without the bevel shape. Next, in the second milling process, which is the bevel milling (or pole milling), the bevel shape of the laminate 224 is performed to create 226. As shown in FIG. 5, the latter process also consumes the top such that the final structure looks similar to the structure 213, with the layer 222 being narrower.

Figure 6:
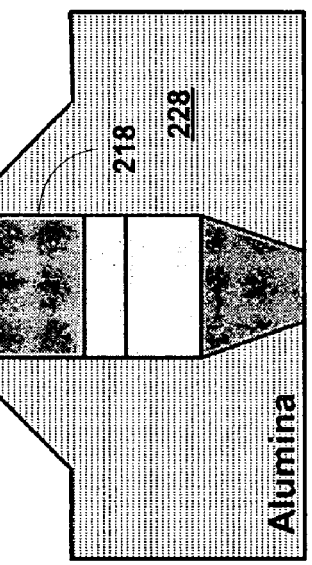

Next, as shown in FIG. 6, an alumina layer 228 is deposited all around the structure 213. Due to the presence of the structure 213, a dome-shaped alumina structure 228 appears where the alumina appears raised above the structure 213. Alumina is the same as $Al_2O_3$. The alumina layer 228 refilling of the structure 213, of FIG. 5, serves as support thereof.

Figure 7:
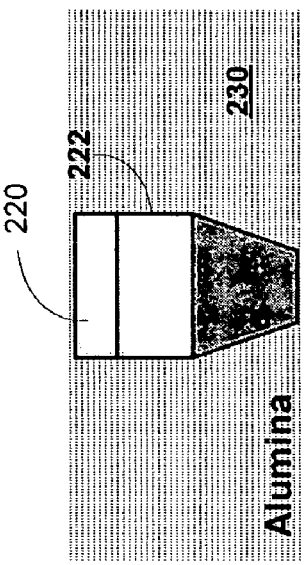

Next, in FIG. 7, a CMP process is performed to remove the durimide layer 218 with the DLC layer 220 and the Rh layer 222 serving as CMP stop layers. Alumina and Rh have a selectivity ratio of 1000:1. That is, removing 1000 nanometers of $Al_2O_3$ results in only removing 1 nanometers of Rh, which is, in part, the reason for the Rh layer 222 acting as a stop layer. The same holds true for DLC with respect to acting as a stop layer, i.e. its selectivity ratio with respect to $Al_2O_3$ is 1:1000. The CMP process is essentially used to planarize the surface of the trailing shield. Along with the removal of the durimide layer 218, the part of the alumina 228 that was used to cover the durimide layer 218 is also removed to leave behind only a part of the alumina layer 228, the remaining alumina layer is shown as the alumina layer 230, in FIG. 8.

Figure 9:
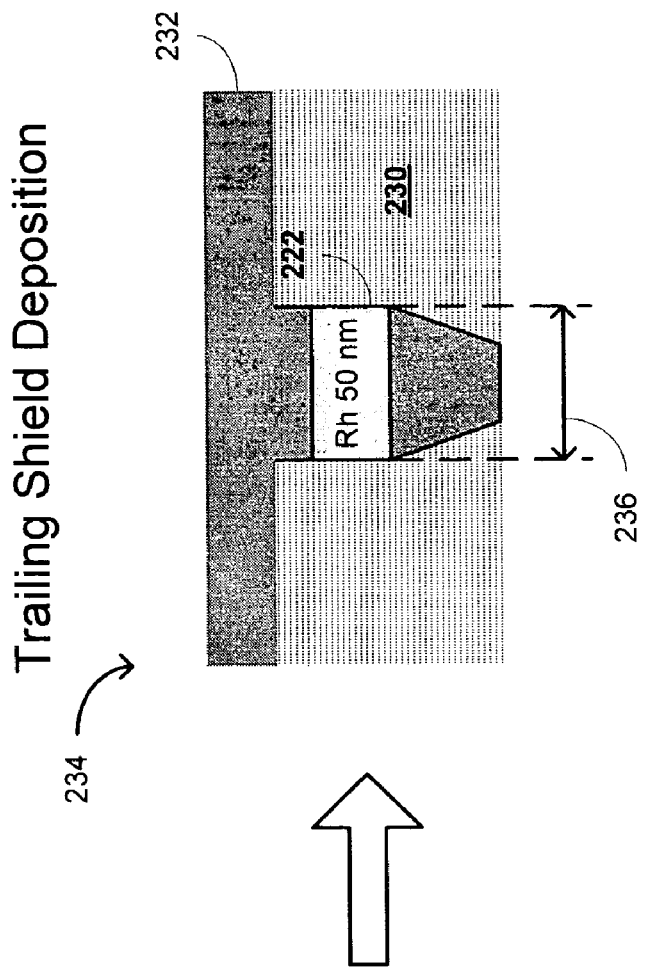
Figure 8:
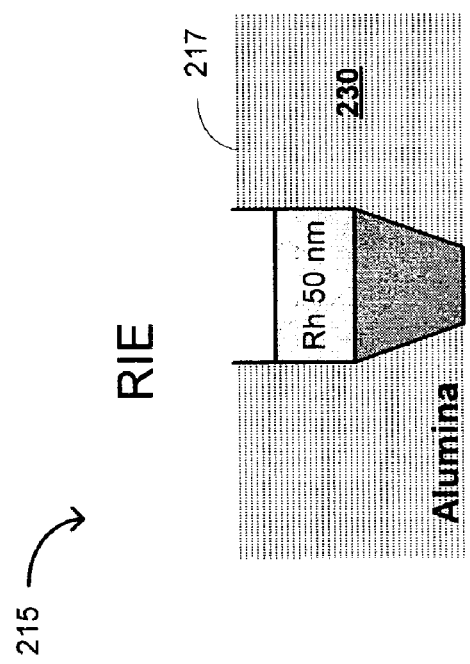

Next, a reactive ion etching (RIE) process 215 is performed for removing the DLC layer 220 of FIG. 7 to create a trench within the structure 217 of FIG. 8. As shown in FIG. 9, the next step is forming the trailing shield 232. In one embodiment, the trailing shield 234 is deposited. In yet another embodiment, the trailing shield 232 may be formed by plating. In one embodiment of the present invention, NiFe is deposited as the trailing shield. As shown, the alumina layer 230 remains.

The present invention allows the formation of the trailing shield 232 by a self-aligned process that eliminates misregistration and mismatch occurring in the photolithography processes of the prior art. Additionally, the process of the present invention allows for the formation and preservation of the crucial distance between the main pole 226 and the trailing shield 232, namely the gap 222 that in one embodiment is formed by Rh. Furthermore, the Rh layer 222, acts as a stop layer, preventing the corner rounding problem of prior art techniques. The track width 236 is equal to and defined by the width of the main pole at its upper side 237. It is important to prevent erosion thereof for proper writing or programming of data onto tracks. The Rh layer 222 prevents corner rounding to prevent curved transition of the magnetic flux utilized for programming data onto tracks, as apposed to the desired sharp transitions, which is achieved without corner rounding and damage. That is, the desired transitions should be perpendicular to the concentric tracks and in the presence of corner rounding, these transitions, rather than being sharp, i.e. perpendicular, are curved.

Although the present invention has been described in terms of specific embodiments, it is anticipated that alterations and modifications thereof will no doubt become apparent to those skilled in the art. It is therefore intended that the following claims be interpreted as covering all such alterations and modification as fall within the true spirit and scope of the invention.

What is claimed is:

1. A method of manufacturing a perpendicular write head comprising:
   forming a laminate layer;
   forming a metal layer upon the laminate layer;
   forming a diamond-like carbon (DLC) layer upon the metal layer;
   forming a durimide layer upon the diamond-like carbon layer;
   forming a hard mask layer upon the durimide layer;
   forming an anti-reflective layer upon the hard mask layer;
   forming an image resist layer upon the anti-reflective layer;
   performing a reactive ion milling to transfer a pattern from the image resist layer to the anti-reflective layer, and then to the hard mask layer, and finally to the durimide and the DLC layer, leaving the hard mask layer, the durimide layer and a DLC layer;
   performing ion milling to remove the hard mask layer;
   depositing alumina that covers the top and sides of the durimide layer and surrounds the DLC layer and hard mask layer;
   performing chemical mechanical planarization (CMP) process to remove the alumina deposited on the top and sides of the durimide layer and the durimide layer; and
   reactive ion etching (RIE) to remove the DLC layer for creating a trench for deposition of trailing shield.

2. The method of manufacturing a perpendicular write head, as recited in claim 1, wherein the image resist layer is made of [248 nm, 193 nm 157 nm] photoresist layer.

3. The method of manufacturing a perpendicular write head, as recited in claim 2, wherein a thickness of the image resist layer is within the range 100-250 nanometers.

4. The method of manufacturing a perpendicular write head, as recited in claim 1, wherein the metal layer is made of Rhodium (Rh).

5. The method of manufacturing a perpendicular write head, as recited in claim 1, wherein the anti-reflective layer is a durimide layer and has a thickness within the range 20-120 nanometers.

6. The method of manufacturing a perpendicular write head, as recited in claim 1, wherein the hard mask is made of a silicon dioxide (SiO$_2$) layer and has a thickness within the range 50-150 nanometers.

7. The method of manufacturing a perpendicular write head, as recited in claim 1, wherein the durimide layer acts as an ion milling mask and has a thickness within the range 500-1500 nanometers.

8. The method of manufacturing a perpendicular write head, as recited in claim 1, wherein the thickness of the Rh layer is within the range 10-50 nanometers.

9. The method of manufacturing a perpendicular write head, as recited in claim 1, wherein the thickness of the DLC layer is within the range 5-50 nanometers.

10. The method of manufacturing a perpendicular write head, as recited in claim 1, wherein the thickness of the laminate layer is within the range 25-250 nanometers.

11. The method of manufacturing a perpendicular write head, as recited in claim 1, further including the step of depositing the trailing shield in the trench and above the alumina.

12. The method of manufacturing a perpendicular write head, as recited in claim 1, wherein the ion milling step causing beveling of the laminate layer thereby creating a beveled main pole.

13. The method of manufacturing a perpendicular write head, as recited in claim 1, wherein after the CMP step, the DLC layer and the metal layer serving as CMP stop layers.

* * * * *